UNITED STATES PATENT OFFICE.

JOHN K. ALPAUGH, OF KANSAS CITY, MISSOURI.

SOAP COMPOUND.

SPECIFICATION forming part of Letters Patent No. 269,820, dated January 2, 1883.

Application filed September 21, 1882. (No specimens.)

*To all whom it may concern:*

Be it known that I, JOHN K. ALPAUGH, a citizen of the United States, residing at Kansas City, in the county of Jackson and State of Missouri, have invented certain new and useful Improvements in Soap Compounds; and I do hereby declare the following to be a full, clear, and exact description of the invention, such as will enable others skilled in the art to which it appertains to make and use the same.

This invention relates to a new soap compound; and it consists mainly in combining with oleaginous matter saponine extracted from any plant capable of producing it, but preferably that obtained from a plant growing wild in New Mexico, known by the Mexican inhabitants under the name of "palmea" and by the American residents as "soap-weed." The root of this plant is commonly used as a substitute for soap; but in this form it is inconvenient to use, and I have discovered that by crushing and steaming the root the active principle or saponine can be extracted in such a form that by a proper process it can readily be combined with oleaginous matter and form an excellent soap, that will not only be found very useful for washing and ordinary toilet purposes, but will also be found to possess great healing properties, and to have an extraordinary effect in promoting the growth of the hair.

In making my soap from palmea or soap-weed I prefer the following process: I take a quantity of the root of the plant, and after crushing it place it in a tank and steam it from four to six hours, after which it is pressed and the extract resulting from the pressure is run off into a tank. Then a lye made from caustic soda about 36° strong is added thereto at the rate of about two parts of lye to five parts of the extract, and the two allowed to remain for a short time, after which about three parts of oil, tallow, or other grease is added and the whole thoroughly mixed. The compound then thickens and hardens, and may be cut into bars or pressed into molds in the usual manner; or it may be run into molds before the hardening takes place.

In some cases, instead of crushing the root, I propose to make it into a pulp, and mix said pulp with the other ingredients instead of only using the extract.

I do not limit myself to the exact compound herein described, as other alkalies may be used in combination with the root-extract and oleaginous matter without departing from the nature of my invention. Nor do I limit myself to the use of the precise plant named, although I prefer it on account of the valuable property it has of promoting the growth of the hair; but other plants containing saponine may be used in making my soap compound.

I am aware that it is not new to extract saponine from various plants, that soap-wort or saponia has been used as an ingredient in liquid cleansing compounds, and that it has been used for medicinal and other purposes; but it has not, to the best of my knowledge and belief, ever been combined with oleaginous matter to form soap.

What I claim as new is—

1. The process herein described of making a soap compound, which consists in crushing and steaming the material containing saponine, adding lye thereto, and finally mixing oleaginous matter therewith, substantially as described.

2. A soap compound in which oleaginous matter is combined with liquid saponine, substantially as and for the purpose specified.

3. A soap compound composed of oleaginous matter, alkaline matter, and the extract of palmea or soap-weed, substantially as described.

4. A soap compound composed of oleaginous and alkaline matter and pulp made from the palmea or soap-weed, substantially as described.

In testimony whereof I affix my signature in presence of two witnesses.

JOHN K. ALPAUGH.

Witnesses:
CHAS. P. MAXWELL,
J. H. GRAGG.